US008368623B2

(12) United States Patent
Lee

(10) Patent No.: US 8,368,623 B2
(45) Date of Patent: Feb. 5, 2013

(54) DISPLAY DEVICE AND DRIVING METHOD THEREOF

(75) Inventor: Baek-Woon Lee, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 1076 days.

(21) Appl. No.: 11/953,954

(22) Filed: Dec. 11, 2007

(65) Prior Publication Data

US 2008/0174576 A1 Jul. 24, 2008

(30) Foreign Application Priority Data

Jan. 23, 2007 (KR) ........................ 10-2007-0006922

(51) Int. Cl.
*G09G 3/30* (2006.01)
*G09G 5/10* (2006.01)
*G06F 3/038* (2006.01)

(52) U.S. Cl. ............. 345/78; 345/77; 345/208; 345/690

(58) Field of Classification Search .............. 345/76–84, 345/204, 208–209, 690–691; 315/169.3
See application file for complete search history.

(56) References Cited

U.S. PATENT DOCUMENTS 5,825,346 A * 10/1998 Fujita ............................ 345/619
6,016,037 A * 1/2000 Kuribayashi et al. ....... 315/169.3
6,222,515 B1 * 4/2001 Yamaguchi et al. ............ 345/89
6,825,824 B2 11/2004 Lee
6,853,384 B2 2/2005 Miyata et al.
7,034,339 B2 * 4/2006 Matsuura et al. ............... 257/79
7,965,263 B2 * 6/2011 Parikh et al. ..................... 345/76
2002/0044109 A1 * 4/2002 Kimura ............................ 345/76
2002/0140691 A1 * 10/2002 Sato et al. ...................... 345/212
2003/0210217 A1 11/2003 Lee
2006/0125812 A1 * 6/2006 Lee ............................... 345/204

FOREIGN PATENT DOCUMENTS

JP 05-069785 3/1993
JP 07-175443 7/1995
JP 10-049127 2/1998
JP 10-074074 3/1998
JP 2001-265298 9/2001
JP 2004-078129 3/2004
JP 2004-096698 3/2004
JP 2005-215584 8/2005
JP 2006-195231 7/2006
KR 1020030087275 A 11/2003
KR 2006-0010127 A 2/2006
KR 1020060035344 A 4/2006
KR 1020060087738 A 8/2006

* cited by examiner

*Primary Examiner* — Bipin Shalwala
*Assistant Examiner* — Keith Crawley
(74) *Attorney, Agent, or Firm* — F. Chau & Associates, LLC

(57) ABSTRACT

A display device includes: a light emitting element; a driving transistor connected to the light emitting element, the driving transistor generating a current according to a data voltage; a switching transistor switching the data voltage according to a gate signal; a capacitor storing the data voltage; a data line connected to the switching transistor, the data line transmitting the data voltage; and a gate line connected to the switching transistor, the gate line transmitting the gate signal. The data voltage includes a first voltage corresponding to luminance information and a second voltage that is a modified voltage of the first data voltage, wherein an average of the first voltage and the second voltage over time is substantially constant.

20 Claims, 5 Drawing Sheets

DISPLAY DEVICE AND DRIVING METHOD THEREOF

CROSS-REFERENCE TO RELATED APPLICATION

This application claims priority to and the benefit of Korean Patent Application No. 10-2007-0006922 filed in the Korean Intellectual Property Office on Jan. 23, 2007, the entire contents of which are incorporated herein by reference.

BACKGROUND OF THE INVENTION (a) Technical Field

The present disclosure relates to a display device and a driving method thereof and, more particularly, to an organic light emitting display and a driving method thereof.

(b) Discussion of Related Art

In general, an active matrix flat panel display includes a plurality of pixels displaying an image, and it displays an image by controlling the luminance of respective pixels based on given display information. Among such active matrix flat panel displays, an organic light emitting display is a self-emissive display device having low power consumption, a wide viewing angle, and a high response speed, so that the organic light emitting display is being spotlighted as a next-generation display device to supplant the liquid crystal display (LCD).

Each pixel of an organic light emitting display includes an organic light emitting element, a driving transistor driving the organic light emitting element, and a switching transistor applying a data voltage to the driving transistor. The transistors are each implemented in the form of a thin film transistor (TFT). The TFTs are classified as a crystalline silicon TFT including a poly-crystalline or micro-crystalline silicon active layer and an amorphous silicon (abbreviated to "a-Si") active layer.

The a-Si is easily processed due to its low deposition temperature. It is difficult for a TFT adopting a-Si as a channel layer to drive a high current, however, because of its low electron mobility. Additionally, the threshold voltage of an a-Si TFT is apt to be varied as time passes.

On the other hand, although crystalline silicon has high electron mobility, the off-current of a crystalline silicon TFT is so high that vertical crosstalk may be generated.

Accordingly, an a-Si TFT is more suitable for a switching transistor than for a driving transistor, but on the other hand a crystalline silicon TFT is relatively suitable for a driving transistor.

The employment of both the a-Si TFT and the crystalline silicon TFT, however, may complicate the manufacturing process to increase the time and cost.

SUMMARY OF THE INVENTION

An exemplary embodiment of the present invention provides a display device including: a light emitting element; a driving transistor connected to the light emitting element, the driving transistor generating a current according to a data voltage; a switching transistor switching the data voltage according to a gate signal; a capacitor storing the data voltage; a data line connected to the switching transistor, the data line transmitting the data voltage; and a gate line connected to the switching transistor, the gate line transmitting the gate signal. The data voltage includes a first voltage corresponding to luminance information and a second voltage that is a modified voltage of the first data voltage, wherein a time average of the first voltage and the second voltage is substantially constant.

The data line may transmit the second voltage and the first voltage successively, and the capacitor may store the first voltage while the switching transistor is turned off.

Each switching transistor and driving transistor may include a semiconductor having substantially the same crystalline structure and, particularly, the switching transistor and the driving transistor may include crystalline silicon.

An exemplary embodiment of the present invention provides a display device including: a plurality of pixels having luminance according to data voltages and including switching transistors switching the data voltages according to gate signals; a plurality of data lines is connected to the switching transistor and transmits the data voltages; a plurality of gate lines is connected to the switching transistors and transmits the gate signals; a data driver converting output image signals to the data voltages to be applied to the data lines; a gate driver applying the gate signals to the gate lines; and a signal controller processes each of the input image signals to generate a modified image signal and outputting pairs of the input image signal and the modified image signal as the output image signals. Each of the data voltages includes a first voltage corresponding to an input image signal and a second voltage corresponding to a modified image signal, wherein a time average of the first voltage and the second voltage is substantially constant over the data voltages.

The switching transistor may include crystalline silicon, such as solid-phase crystallized silicon or micro-crystalline silicon.

The signal controller may include a storage for storing the input image signals, a modifier modifying the input image signals supplied from the storage into the modified image signals; and a selector selecting and outputting one of the input image signal supplied from the storage and the modified image signal supplied from the modifier, in each pair of the input image signal and the modified image signal.

The plurality of pixels may be arranged in rows, and the storage may include a row memory storing input image signals for a row of pixels.

The modifier may include a lookup table storing values of the input image signal and the modified image signal in pairs.

The selector may include a multiplexer selecting one of the input image signal and the modified image signal in each pair according to a selection signal.

The pixels may further include a plurality of capacitors storing the data voltages, a plurality of driving transistors generating driving currents according to the data voltages, and a plurality of light emitting elements generating light having an intensity according to the driving currents.

The driving transistor may include silicon having substantially the same crystalline structure as the switching transistor.

An exemplary embodiment of the present invention provides a driving method of a display device that includes a plurality of pixels including switching transistors and a plurality of data lines connected to the switching transistors. The method includes: processing an input image signal for each pixel to generate a modified image signal; converting the input image signal into a first voltage; converting the modified image signal into a second voltage; applying the first voltage to a data line for a first time period; and applying the second voltage to the data line for a second time period.

A time average of the first voltage and the second voltage for each of the data lines is substantially constant.

The first time period and the second time period may have substantially the same length.

The switching transistor may include crystalline silicon, such as solid-phase crystallized silicon or micro-crystalline silicon.

The pixels may further include a plurality of capacitors storing the data voltages, a plurality of driving transistors generating driving currents according to the data voltages, and a plurality of light emitting elements generating light having an intensity according to the driving currents.

The driving transistors may include silicon having substantially the same crystalline structure as the switching transistor.

BRIEF DESCRIPTION OF THE DRAWINGS

Exemplary embodiments of the present invention will be understood in more detail from the following descriptions taken in conjunction with the accompanying drawings.

DETAILED DESCRIPTION OF EXEMPLARY EMBODIMENTS

The present invention will be described more fully hereinafter with reference to the accompanying drawings, in which exemplary embodiments of the present invention are shown.

Initially, an organic light emitting display according to an exemplary embodiment of the present invention will be described in detail with reference to FIG. 1 and FIG. 2.

Figure 1:
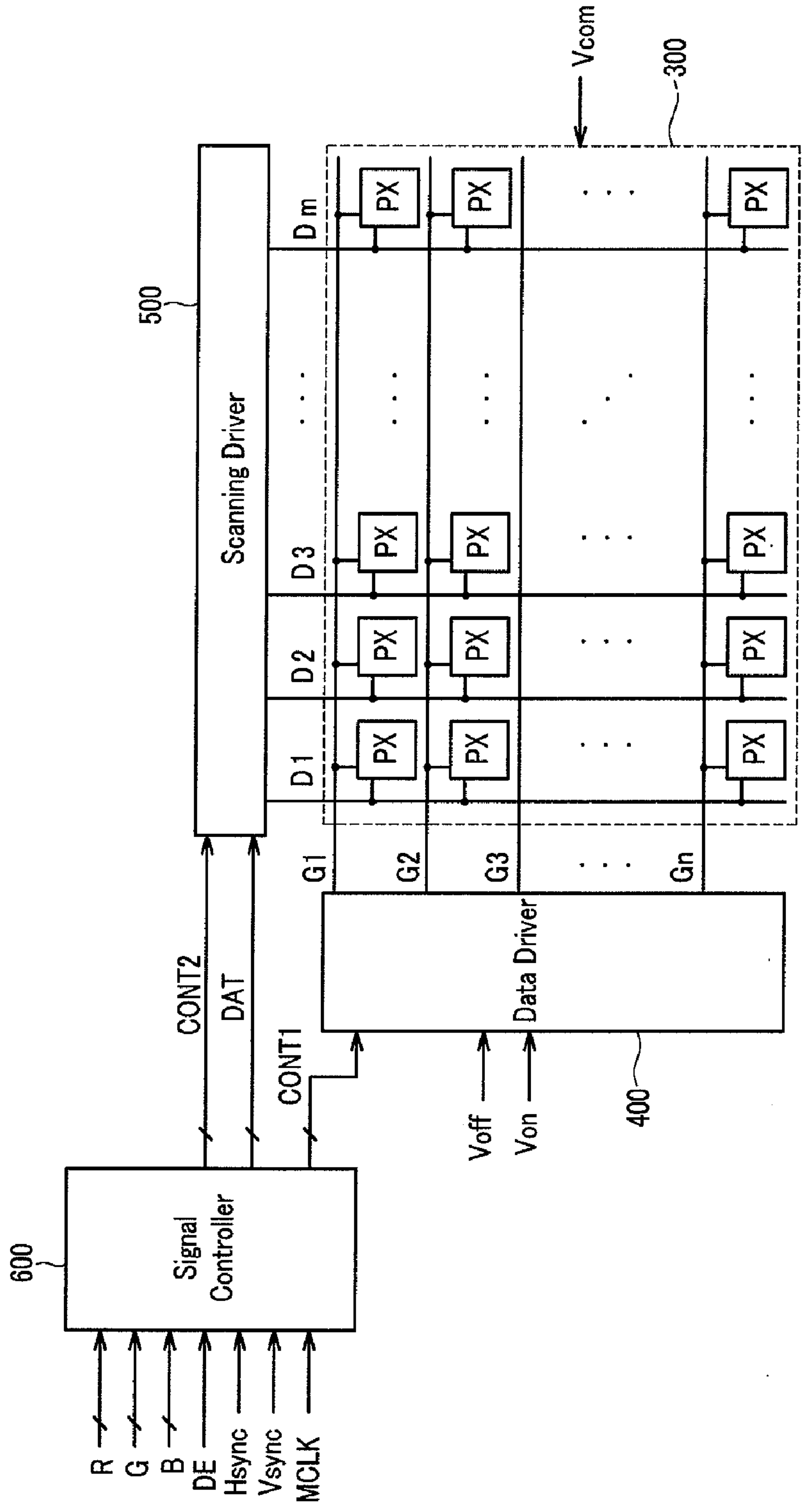
FIG. 1 is a block diagram of an organic light emitting display according to an exemplary embodiment of the present invention.
Figure 2:
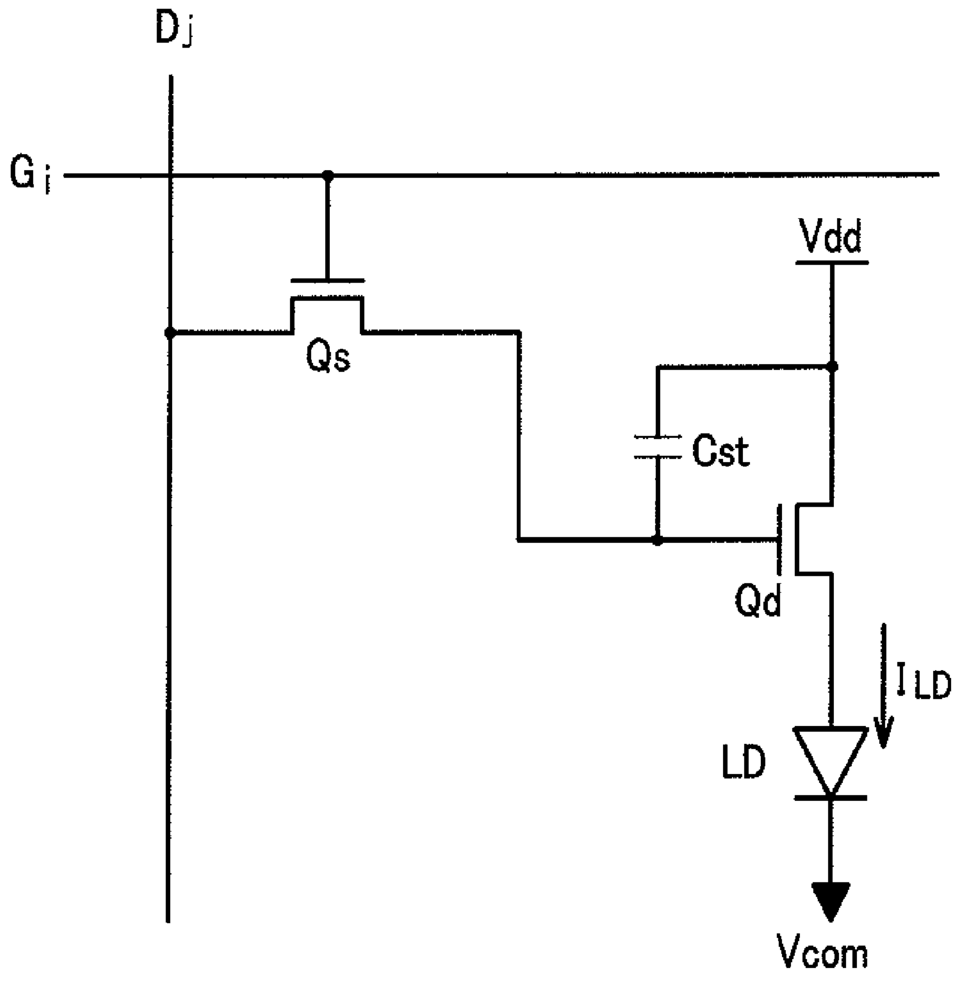
FIG. 2 is an equivalent circuit diagram of a pixel of an organic light emitting display according to an exemplary embodiment of the present invention.

FIG. 1 is a block diagram of art organic light emitting display according to an exemplary embodiment of the present invention, and FIG. 2 is an equivalent circuit diagram of a pixel of an organic light emitting display according to an exemplary embodiment of the present invention.

Referring to FIG. 1, an organic light emitting display according to an exemplary embodiment of the present invention includes a display panel 300, a scanning driver 400, a data driver 500, and a signal controller 600.

As shown in FIG. 1, the display panel 300 includes a plurality of signal lines $G_1$-$G_n$ and $D_1$-$D_m$, a plurality of voltage lines (not shown), and a plurality of pixels PX connected to the above elements and arranged substantially in a matrix.

The signal lines $G_1$-$G_n$ and $D_1$-$D_m$ include a plurality of scanning lines $G_1$-$G_n$ transmitting scanning signals and a plurality of data lines $D_1$-$D_m$ transmitting data voltages. The scanning lines $G_1$-$G_n$ extend substantially in a row direction and are substantially parallel to each other, and the data lines $D_1$-$D_m$ extend substantially in a column direction and are substantially parallel to each other.

The voltage lines may include a plurality of driving voltage lines (not shown) transmitting a driving voltage Vdd.

Each pixel PX, for example the pixel PX connected to the i-th (i=1, 2, . . . , n) scanning line $G_i$ and the j-th (j=1, 2, . . . , m) data line $D_j$, includes an organic light emitting element LD, a driving transistor Qd, a storage capacitor Cst, and a switching transistor Qs.

The switching transistor Qs has three terminals including a control terminal, an input terminal, and an output terminal. The control terminal is connected to the scanning line $G_i$, the input terminal to the data line $D_j$, and the output terminal to the driving transistor Qd. The switching transistor Qs transmits data voltages to be applied to a data line $D_j$ in response to a scanning signal applied to a scanning line $G_i$.

The driving transistor Qd also has three terminals including a control terminal, an input terminal, and an output terminal. The control terminal is connected to the switching transistor Qs, the input terminal to the driving voltage Vdd, and the output terminal to the organic light emitting element LD. The driving transistor Qd drives an output current $I_{LD}$ having a magnitude depending on a voltage applied between the control terminal and the output terminal.

The storage capacitor Cst is connected between the control terminal and the input terminal of the driving transistor Qd. The storage capacitor Cst stores a data voltage applied to the control terminal of the driving transistor Qd and maintains it even after the switching transistor Qs is turned off.

The organic light emitting element LD may be an organic light emitting diode (OLED), and it has an anode connected to the output terminal of the driving transistor Qd and a cathode connected to the common voltage Vcom. The organic light emitting element LD emits light having an intensity depending on an output current $I_{LD}$ of the driving transistor Qd, thereby displaying an image.

The organic light emitting element LD may emit light representing one of the primary colors or representing one selected from the three primary colors and white. An example of the primary colors includes the three primary colors of red, green, and blue, and desired colors are displayed by a spatial sum of the three primary colors. On the other hand, the organic light emitting elements LD of all pixels PX may emit white light, and some pixels PX may further include color filters (not shown) for converting the white light emitted from the organic light emitting elements LD into one of the primary colors.

The switching transistor Qs and the driving transistor Qd may have substantially the same crystalline structure and may include n-channel field effect transistors (FETs) including solid-phase crystallized (SPC) silicon or micro-crystalline silicon. At least one of the switching transistor Qs and the driving transistor Qd, however, may be a p-channel FET. Also, the connection relationship among the transistors Qs and Qd, the capacitor Cst, and the organic light emitting element LD may be modified.

Referring to FIG. 1 again, the scanning driver 400 is connected to the scanning lines $G_1$-$G_n$ in the display panel 300, and applies scanning signals thereto. Each of the scanning signals is a combination of a high voltage Von for turning on the switching transistors Qs and a low voltage Voff for turning off the switching transistors Qs connected to the scanning lines $G_1$-$G_n$.

The data driver 500 is connected to the data lines $D_1$-$D_m$ in the display panel 300 and applies data voltages to the data lines $D_1$-$D_m$.

The signal controller 600 controls the scanning driver 400 and the data driver 500.

Each of the elements 400, 500, and 600 includes at least one integrated circuit (IC) chip (not shown) mounted on the LC panel assembly 300 or on a flexible printed circuit (FPC)

film (not shown) in a tape carrier package (TCP) type, which is attached to the panel assembly 300. Otherwise, the elements 400, 500 and 600 may be mounted on a separate printed circuit board (PCB) (not shown). Alternatively, the elements 400, 500, and 600 may be integrated onto the display panel 300 along with the signal lines $G_1$-$G_n$ and $D_1$-$D_m$ and the switching transistors Qs. Moreover, the elements 400, 500, and 600 may be integrated into a single chip, and in this case, at least one of these devices, or at least one circuit element forming them, may be located outside the single chip.

The operation of such an organic light emitting display will now be described in detail with reference to FIG. 3A to FIG. 4B.

Figure 3A:
FIG. 3A and FIG. 4A are examples of a timing diagram illustrating a data voltage in an organic light emitting display according to the prior art.
Figure 3B:
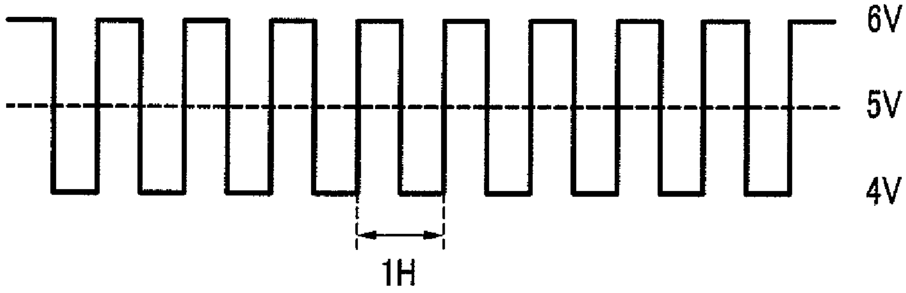
FIG. 3B and FIG. 4B, each of which corresponds to FIG. 3A and FIG. 4A, respectively, are examples of a timing diagram illustrating a data voltage in an organic light emitting display according to an exemplary embodiment of the present invention.
Figure 4A:
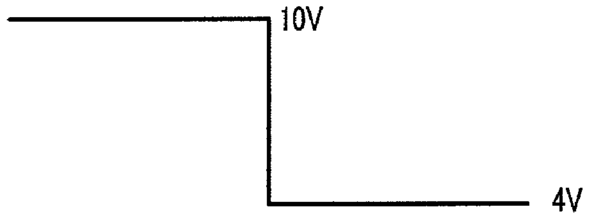
Figure 4B:
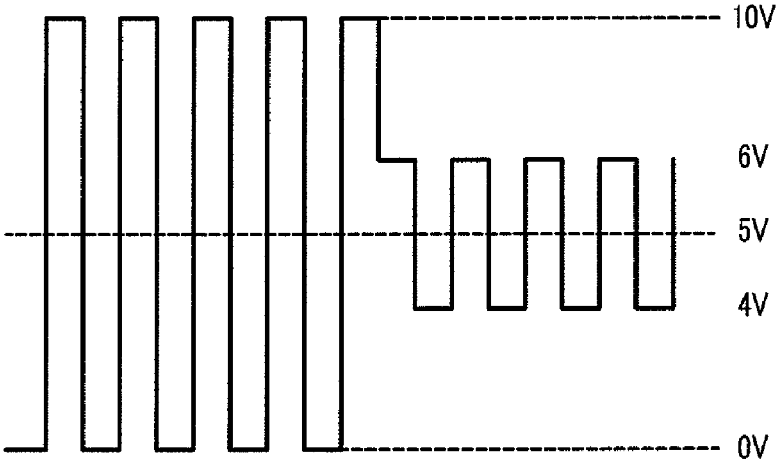

FIG. 3A and FIG. 4A are timing diagrams illustrating examples of data voltages in a conventional organic light emitting display. FIG. 3B and FIG. 4B are timing diagrams illustrating data voltages in an organic light emitting display according to an exemplary embodiment of the present invention and correspond to FIG. 3A and FIG. 4A, respectively.

The signal controller 600 receives input image signals R, G, and B and input control signals controlling the display of the input image signals R, G, and B from an external graphics controller (not shown). The input image signals R, G, and B contain luminance information for the pixels PX, and the luminance has a predetermined number of gray values, for example, 1024 (=$2^{10}$), 256 (=$2^8$), or 64 (=$2^6$) gray values. The input control signals include, for example, a vertical synchronization signal Vsync, a horizontal synchronization signal Hsync, a main clock signal MCLK, and a data enable signal DE.

On the basis of the input control signals and the input image signals R, G, and B, the signal controller 600 appropriately processes the input image signals R, G, and B to be suitable for the operating condition of the display panel 300 and generates scanning control signals CONT1 and data control signals CONT2. Then, the signal controller 600 transmits the scanning control signals CONT1 to the scanning driver 400 and transmits the processed image signals DAT and the data control signals CONT2 to the data driver 500.

The scanning control signals CONT1 include a scanning start signal for instructing to start scanning, and at least one clock signal for controlling the output period of a high voltage Von. The scanning control signals CONT1 may further include an output enable signal OE for defining the duration of the high voltage Von.

The data control signals CONT2 include a horizontal synchronization start signal for indicating a start to transmit the digital image signals DAT for a row of pixels PX, a load signal for instructing to apply analog data voltages to the data lines $D_1$-$D_m$, and a data dock signal.

In response to the data control signals CONT2 from the signal controller 600, the data driver 500 receives the digital image signals DAT for a row of pixels PX, converts the digital image signals DAT into analog data voltages, and then applies the analog data voltages to the corresponding data lines $D_1$-$D_m$.

The scanning driver 400 applies the high voltage Von to the scanning lines $G_1$-$G_n$ in response to the scanning control signals CONT1 from the signal controller 600, thereby turning on the switching elements Qs connected to the scanning lines $G_1$-$G_n$. Then, data voltages applied to the data lines $D_1$-$D_m$ are transmitted to the corresponding pixels PX through the turned-on switching transistors Qs.

The driving transistor Qd supplied with a data voltage through the turned-on switching transistor Qs generates an output current $I_{LD}$ corresponding to the data voltage. Then, the organic light emitting element LD emits light having an intensity corresponding to the output current $I_{LD}$ from the driving transistor Qd.

By repeating this procedure by a unit of one horizontal period, which is also denoted as "1H" and is equal to one period of the horizontal synchronization signal Hsync and the data enable signal DE, all scanning lines $G_1$-$G_n$ are sequentially supplied with the high voltage Von, thereby applying data voltages to all pixels PX to display an image constituting a frame.

In this way, the luminance of each pixel PX depends on the data voltage that is determined by the input image signal R, G, and B supplied from the outside.

In the following example it is assumed that original data voltages corresponding to an input image signal R, G, and B maintain 4V during several horizontal periods as shown in FIG. 3A.

In FIG. 3B, one horizontal period is divided into two sections formed of a preceding section and a succeeding section, wherein the original data voltage (=4V) corresponding to the input image signal R, G, and B is applied during the succeeding section, while a modified data voltage (=6V) is applied during the preceding section. If the length of the preceding section is the same as that of the succeeding section, the average data voltage over time is 5V.

In this way, applied voltages are determined such that the average of the data voltages in the preceding section and the succeeding section can be constant, that is, 5V.

As shown in FIG. 4A, it is assumed that the original data voltages corresponding to an input image signal R, G, and B are 10V during several horizontal periods and 4V during the next several horizontal periods.

Referring to FIG. 4B, when the original data voltage is 10V, the original data voltage (=10V) is applied during the succeeding section, while a modified data voltage (=0V), which is a symmetrical value with respect to 5V, is applied during the preceding section. When the original data voltage is 4V, the original data voltage (=4V) is applied during the succeeding section while a modified data voltage (=6V), which is a symmetrical value with respect to 5V, is applied during the preceding section as in FIG. 3B. In this way, the time average of data voltages is 5V under the condition that the length of the preceding section is the same as that of the succeeding section.

In this manner, since the average of voltages applied to each data line $D_1$-$D_m$ over time is always 5V, the level of a leakage current of each pixel PX is also uniform considering only the direct current (DC) component and, accordingly, crosstalk substantially disappears.

Because the voltage applied to a data line $D_1$-$D_m$ keeps varying, however, the leakage current may have different levels according to the pixels PX if the alternating current (AC) component is considered.

If it is taken into consideration that there is a leakage current in an off state of the switching transistor Qs, the switching transistor Qs may be seen as a resistor, and this resistor and the capacitor Cst may be regarded as a resistor-capacitor (EC) filter. Such an RC filter functions as a low-pass filter having influence on the control terminal of the driving transistor Qd.

For example, when the off current is 0.1 nA, the cutoff frequency of the low-pass filter is about 30 Hz. When the frequency of the AC component is about 2.6 Hz, the AC component having passed through the low-pass filter is reduced by about 1/500. Since the average amplitude is 5V when the range of a data voltage is 10V, the amplitude of the AC component having passed through the low-pass filter is only about 10 mV, which makes a change in luminance of a pixel PX hardly detectable. Since the frequency of an AC component is up to about 47 kHz even in an XGA organic light emitting display of which the frame frequency is 60 Hz, a luminance change due to the AC component in an organic light emitting display is ignorable.

Meanwhile, assume that the ratio of the length of the preceding section to that of the succeeding section is 1−t:t (0<t<1), that is, the duty ratio is t. The original data voltage is denoted as Vd, the modified data voltage as V1, and a predetermined voltage (previously 5V) as Vc. the voltage Vc may be an intermediate value in the data voltage range, or it may not be.

For the time average of data voltages in the preceding section and the succeeding section to be Vc, the following equation should be satisfied:

$$tVd+1=tV1=Vc.$$

Therefore, the modified data voltage V1 is given by:

$$V1=(Vc-tVd)/1-t$$

Because the preceding section is relatively very short while the voltage stored and maintained for a long time in the capacitor Cst is actually the original data voltage in the succeeding section, however, the luminance of a pixel PX is substantially dependent only on the original data voltage.

An exemplary embodiment of a signal controller for driving as described above will be described in detail with reference to FIG. 5.

Figure 5:
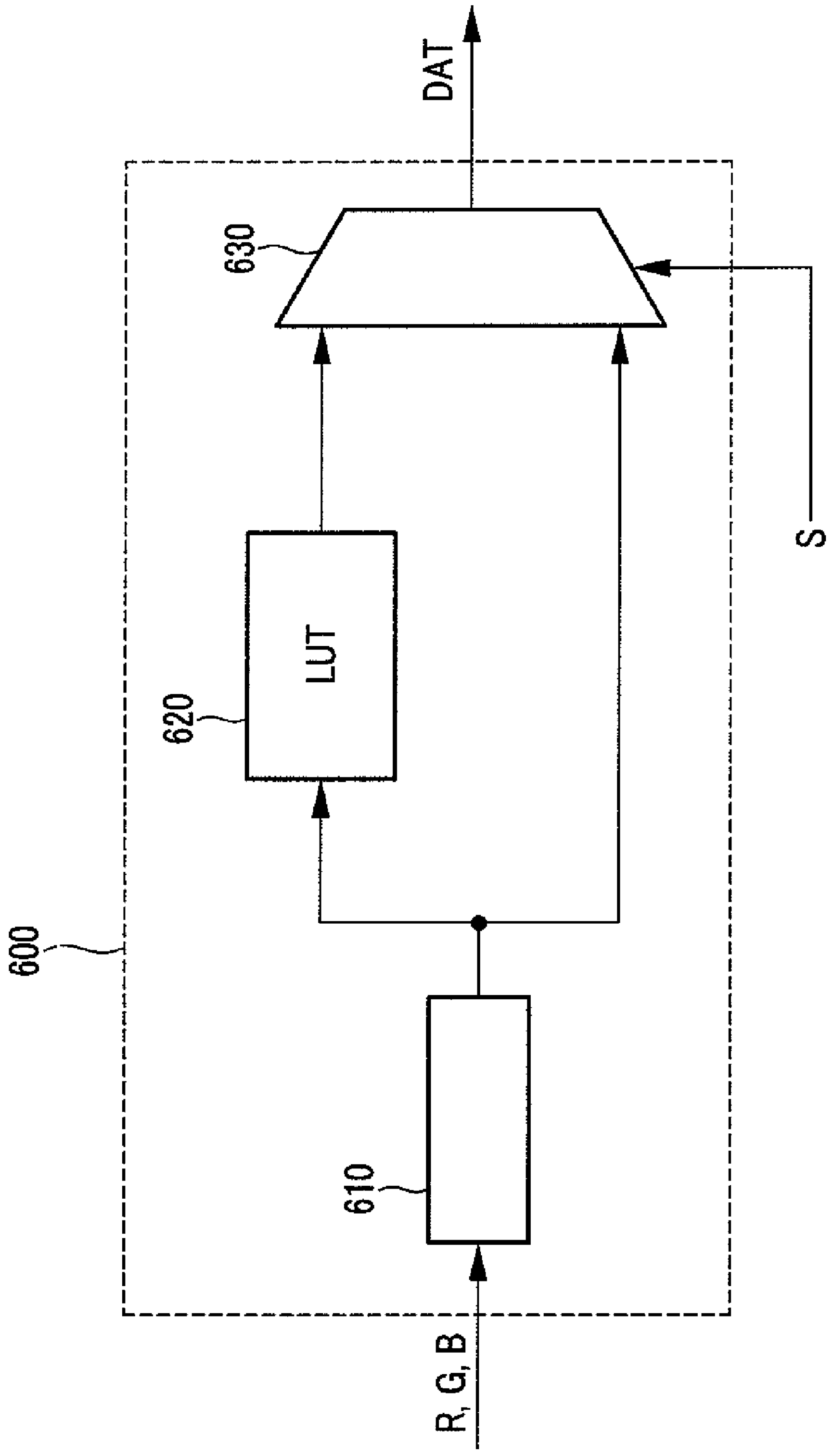
FIG. 5 is a block diagram of a signal controller of an organic light emitting display according to an exemplary embodiment of the present invention.

FIG. 5 is a block diagram of a signal controller of an organic light emitting display according to an exemplary embodiment of the present invention.

As shown in FIG. 5, a signal controller 600 of an organic light emitting display according to an exemplary embodiment of the present includes a row memory 610, a lookup table (LUT) 620, and a multiplexer 630.

Input image signals R, G, and B for a row of pixels PX inputted from the outside are stored in the row memory 610.

The lookup table 620 outputs modified image signals R', G', and B' corresponding to the input image signals R, G, and B received from the row memory 610. The modified image signals R', G', and B' are image signals corresponding to the modified data voltage V1 described above.

The multiplexer 630 receives the input image signals R, G, and B from the row memory 610 and the modified image signals R', G', and B' from the lookup table 620, and then applies one of the two kinds of signals to the data driver 500 as output image signals DAT in response to a selection signal S. The selection signal S, which is for distinguishing between a preceding section and a succeeding section, controls the multiplexer 630 to select the modified image signals R', G', and B' in the preceding section and the input image signals R, G, and B in the succeeding section.

The data driver 500 converts the output image signals DAT into data voltages and applies them to the data lines for a predetermined time.

In this manner, crosstalk can be reduced by making the leakage current uniform over all pixels even when a switching transistor having a large leakage current is adopted.

While this invention has been described in connection with what is presently considered to be exemplary embodiments, it is to be understood that the invention is not limited to the disclosed embodiments but, on the contrary, is intended to cover various modifications and equivalent arrangements included within the spirit and scope of the appended claims.

What is claimed is:

1. A display device comprising:

a light emitting element;

a driving transistor connected to the light emitting element, the driving transistor generating a current according to a data voltage fed thereto;

a switching transistor switching the data voltage according to a gate signal fed thereto;

a capacitor storing the data voltage;

a data line connected to the switching transistor, the data line transmitting the data voltage; and a gate line connected to the switching transistor, the gate line transmitting the gate signal, wherein the data voltage comprises a first voltage corresponding to luminance information, and a second voltage that is a modified voltage of the first data voltage, wherein the first voltage and the second voltage have a same polarity or 0 volts, wherein the first voltage and the second voltage are supplied during one horizontal period, and wherein an average of the first voltage and the second voltage over time is substantially constant.

2. The display device of claim 1, wherein:

the data line transmits the second voltage and the first voltage successively; and the capacitor stores the first voltage while the switching transistor is turned off.

3. The display device of claim 1, wherein each of the switching transistor and the driving transistor includes a semiconductor having substantially the same crystalline structure.

4. The display device of claim 3, wherein the switching transistor and the driving transistor include crystalline silicon.

5. The display device of claim 4, wherein the switching transistor and the driving transistor include one of solid-phase crystallized silicon and micro-crystalline silicon.

6. A display device comprising:

a plurality of pixels having luminance according to data voltages and including a plurality of switching transistors switching the data voltages according to gate signals fed thereto;

a plurality of data lines respectively connected to the plurality of switching transistors and transmitting the data voltages;

a plurality of gate lines respectively connected to the plurality of switching transistors and transmitting the gate signals;

a data driver converting output image signals into the data voltages and applying the data voltages to the plurality of data lines;

a gate driver applying the gate signals to the plurality of gate lines; and a signal controller that processes input image signals to generate modified image signals and outputting pairs of the input image signal and the modified image signal as the output image signals, wherein each of the data voltages comprises a pair of a first voltage corresponding to an input image signal, and a second voltage corresponding to a modified image signal, wherein the first voltage and the second voltage have a same polarity or 0 volts, wherein the first voltage and the second voltage are supplied during one horizontal period, and wherein an average of the first voltage and the second voltage is substantially constant over time.

7. The display device of claim 6, wherein the switching transistors comprise crystalline silicon.

8. The display device of claim 7, wherein the switching transistors comprise one of solid-phase crystallized silicon and micro-crystalline silicon.

9. The display device of claim 6, wherein the signal controller comprises:

a storage unit storing the input image signals;

a modifier modifying the input image signals supplied from the storage unit into the modified image signals; and a selector selecting and outputting one of the input image signal supplied from the storage unit and the modified image signal supplied from the modifier from each pair of the input image signal and the modified image signal.

10. The display device of claim 9, wherein: the plurality of pixels are arranged in rows and the storage unit comprises a row memory storing input image signals for a row of pixels.

11. The display device of claim 9, wherein the modifier comprises a lookup table storing values of the input image signal and the modified image signal in pairs.

12. The display device of claim 9, wherein the selector comprises a multiplexer selecting one of the input image signal and the modified image signal in each pair according to a selection signal fed thereto.

13. The display device of claim 6, wherein the plurality of pixels further comprise:

a plurality of capacitors storing the data voltages;

a plurality of driving transistors generating driving currents according to the data voltages; and a plurality of light emitting elements generating light having an intensify according to the driving currents.

14. The display device of claim 13, wherein the plurality of driving transistors comprise silicon having substantially the same crystalline structure as the plurality of switching transistors.

15. A driving method of a display device that includes a plurality of pixels including a plurality of switching transistors and a plurality of data lines connected to the plurality of switching transistors, the method comprising:

processing an input image signal for each pixel to generate a modified image signal;

converting the input image signal into a first voltage;

converting the modified image signal into a second voltage;

applying the first voltage to a data line for a first time period; and applying the second voltage to the data line for a second time period, wherein the first voltage and the second voltage have a same polarity or 0 volts, wherein the first voltage and the second voltage are supplied during one horizontal period, and wherein an average of the first voltage and the second voltage over time for each of the data lines is substantially constant.

16. The driving method of claim 15, wherein the first time period and the second time period have substantially the same length.

17. The driving method of claim 16, wherein the plurality of switching transistors comprises crystalline silicon.

18. The driving method of claim 17, wherein the plurality of switching transistors comprises one of solid-phase crystallized silicon and micro-crystalline silicon.

19. The driving method of claim 17, wherein the plurality of pixels further comprises:

a plurality of capacitors storing the data voltages;

a plurality of driving transistors generating driving currents according to the first voltages; and a plurality of light emitting elements generating light having an intensity according to the driving currents.

20. The driving method of claim 19, wherein the plurality of driving transistors comprises silicon having substantially the same crystalline structure as the plurality of switching transistors.

* * * * *